United States Patent
Forner, Sr. et al.

(10) Patent No.: US 7,823,547 B2
(45) Date of Patent: Nov. 2, 2010

(54) SYSTEM AND METHOD FOR SPLIT-CYCLE ENGINE WASTE HEAT RECOVERY

(75) Inventors: Charles K. Forner, Sr., Beaver, PA (US); Salvatore C. Scuderi, Westfield, MA (US); Stephen P. Scuderi, Westfield, MA (US)

(73) Assignee: Scuderi Group, LLC, West Springfield, MA (US)

( * ) Notice: Subject to any disclaimer, the term of this patent is extended or adjusted under 35 U.S.C. 154(b) by 0 days.

(21) Appl. No.: 12/426,905

(22) Filed: Apr. 20, 2009

(65) Prior Publication Data

US 2009/0199556 A1 Aug. 13, 2009

Related U.S. Application Data

(63) Continuation of application No. 11/724,455, filed on Mar. 15, 2007, now Pat. No. 7,571,699.

(60) Provisional application No. 60/785,435, filed on Mar. 24, 2006.

(51) Int. Cl.
*F02M 43/00* (2006.01)
(52) U.S. Cl. .................................................. 123/70 R
(58) Field of Classification Search ............... 60/652, 60/659, 597, 39.6, 39.63, 39.464; 417/228; 123/70 R, 68, 71 R, 320, 145 R; 177/217, 177/245; *F02M 43/00*
See application file for complete search history.

(56) References Cited

U.S. PATENT DOCUMENTS

| 4,176,630 | A | * | 12/1979 | Elmer | 123/41.12 |
| 4,224,798 | A | * | 9/1980 | Brinkerhoff | 60/652 |
| 5,215,044 | A | * | 6/1993 | Banzhaf et al. | 123/41.29 |
| 6,079,373 | A | * | 6/2000 | Kawamura | 123/3 |
| 6,952,923 | B2 | * | 10/2005 | Branyon et al. | 60/597 |
| 2007/0266964 | A1 | * | 11/2007 | Soderberg | 123/41.11 |

* cited by examiner

*Primary Examiner*—Michael Cuff
*Assistant Examiner*—Keith Coleman
(74) *Attorney, Agent, or Firm*—Fildes & Outland, P.C.

(57) ABSTRACT

A waste heat recovery system for a split-cycle engine includes a heat exchange unit. An air compressor device is in communication with the heat exchange unit. A waste heat input receives waste heat from the engine and is in fluid communication with the heat exchange unit. An ambient air intake connected to the air compressor device draws air into the air compressor device. A compressed air outlet member on the air compressor device in fluid communication with a compression cylinder of the split-cycle engine delivers compressed air from the air compressor device to the engine. Engine waste heat is communicated to the heat exchange unit and energy from the waste heat is used to drive the air compressor device, causing the air compressor device to draw in ambient air through the ambient air intake, compress the ambient air, and deliver compressed air to the engine through the compressed air outlet.

28 Claims, 4 Drawing Sheets

SYSTEM AND METHOD FOR SPLIT-CYCLE ENGINE WASTE HEAT RECOVERY

CROSS REFERENCE TO RELATED APPLICATION

This application is a continuation application of U.S. application Ser. No. 11/724,455, filed Mar. 15, 2007 now U.S. Pat. No. 7,571,699, titled System and Method 5 for Split-Cycle Engine Waste Heat Recovery, which claims the benefit of U.S. Provisional Application No. 60/785,435, filed Mar. 24, 2006.

TECHNICAL FIELD

This invention relates to split-cycle engines and, more particularly, to waste heat recovery in such engines.

BACKGROUND OF THE INVENTION

The term split-cycle engine as used in the present application may not have yet received a fixed meaning commonly known to those skilled in the engine art. Accordingly, for purposes of clarity, the following definition is offered for the term split-cycle engine as may be applied to engines disclosed in the prior art and as referred to in the present application.

A split-cycle engine as referred to herein comprises:

a crankshaft rotatable about a crankshaft axis;

a power piston slidably received within a power cylinder and operatively connected to the crankshaft such that the power piston reciprocates through a power (or expansion) stroke and an exhaust stroke during a single rotation of the crankshaft;

a compression piston slidably received within a compression cylinder and operatively connected to the crankshaft such that the compression piston reciprocates through an intake stroke and a compression stroke during a single rotation of the crankshaft; and a gas passage interconnecting the power and compression cylinders, the gas passage including an inlet valve and an outlet (or crossover) valve defining a pressure chamber therebetween.

U.S. Pat. Nos. 6,543,225, 6,609,371, and 6,952,923, all assigned to the assignee of the present invention, disclose examples of split-cycle internal combustion engines as herein defined. These patents contain an extensive list of United States and foreign patents and publications cited as background in the allowance of these patents. The term "split-cycle" has been used for these engines because they literally split the four strokes of a conventional pressure/volume Otto cycle (i.e., intake, compression, power and exhaust) over two dedicated cylinders: one cylinder dedicated to the high pressure compression stroke, and the other cylinder dedicated to the high pressure power stroke.

Conventionally, internal combustion engines release unused energy in the form of heat into the ambient environment. Some of this heat energy, however, may be recaptured and used. Use of this heat energy can both reclaim energy that is released by the engine and also reduce fuel consumption, thereby improving the efficiency of the engine.

SUMMARY OF THE INVENTION

Examples of split-cycle type engines are disclosed in U.S. Pat. Nos. 6,543,225, 6,609,371, and 6,952,923 (Scuderi patents), herein incorporated by reference in their entirety.

A split-cycle engine generally includes an engine block having a first cylinder and an adjacent second cylinder extending therethrough. A crankshaft is journaled in the block for rotation about a crankshaft axis. Upper ends of the cylinders are closed by a cylinder head.

The first and second cylinders define internal bearing surfaces in which are received for reciprocation a power piston and a compression piston, respectively. The cylinder head, the power piston, and the first cylinder define a variable volume combustion chamber in the power cylinder. The cylinder head, the compression piston, and the second cylinder define a variable volume compression chamber in the compression cylinder. The cylinder head also includes an air inlet connected to the compression cylinder for communicating intake gas from an intake passage into the compression cylinder.

A gas passage (or cross-over passage) interconnects the power and compression cylinders. The gas passage includes an inlet and an outlet. The gas passage inlet is connected to the compression cylinder and the gas passage outlet is connected to the power cylinder.

The crankshaft includes axially displaced and angularly offset first and second crank throws, having a phase angle therebetween. The first crank throw is pivotally joined by a first connecting rod to the power piston and the second crank throw is pivotally joined by a second connecting rod to the compression piston to reciprocate the pistons in their cylinders in timed relation determined by the angular offset of their crank throws and the geometric relationships of the cylinders, crank, and pistons.

Alternative mechanisms for relating the motion and timing of the pistons may be utilized if desired. The timing may be similar to, or varied as desired from, the disclosures of the Scuderi patents.

An internal combustion engine (ICE) mode of operation is generally the normal operating mode of a split-cycle engine. The intake, compression, power and exhaust strokes of a conventional piston engine cycle are split between the compression and power cylinders of the split-cycle engine. In the ICE mode, the compression piston draws in and compresses ambient inlet air for use in the power cylinder. Compressed air is admitted to the power cylinder with fuel shortly after the power piston reaches its top dead center (TDC) position at the beginning of an expansion stroke. The fuel/air mixture is then ignited, burned and expanded on the same expansion stroke of the power piston, transmitting power to the crankshaft. The combustion products are discharged on the exhaust stroke.

A waste heat recovery system for a split-cycle engine having a compression cylinder, a power cylinder, and a gas passage interconnecting the compression and power cylinders in accordance with the invention includes a heat exchange unit and an air compressor device in fluid communication with the heat exchange unit. The system also includes a waste heat input in fluid communication with the heat exchange unit that receives and inputs waste heat from the engine into the heat exchange unit. An ambient air intake is connected to the air compressor device for drawing air into the air compressor device. A compressed air outlet member on the air compressor device in fluid communication with the compression cylinder of the split-cycle engine allows for delivery of compressed air from the air compressor device to the engine. Engine waste heat is communicated to the heat exchange unit and energy from the waste heat is used to drive the air compressor device, causing the air compressor device to draw in ambient air through the ambient air intake, compress the ambient air, and deliver compressed air to the engine through the compressed air outlet.

In a specific embodiment, an engine coolant subsystem may be in communication with the heat exchange unit, and engine coolant is circulated from the engine through the heat exchange unit. Further, an engine exhaust subsystem may be in communication with the heat exchange unit to pass engine exhaust gas through the heat exchange unit. The system may also include a circulation line for circulating heat exchange medium between the heat exchange unit and the air compressor device. The heat exchange medium may be one of a refrigerant and water. A condenser may be operatively connected to the circulation line. A pump may be operatively connected to the circulation line for pumping the heat exchange medium through the circulation line.

The split-cycle engine may also include an air storage tank, and the compressed air may be stored in the air storage tank. A first valve may control flow into the storage tank, a second valve may control flow out of the storage tank, and a third valve may control flow across the gas passage, thereby allowing the compressed air to simultaneously charge the storage tank and drive the power cylinder when the first and second valves controlling flow into and out of the storage tank are open and the third valve controlling flow across the gas passage is closed.

In a separate embodiment, a waste heat recovery system for a split-cycle engine having a compression cylinder and a power cylinder includes a heat exchange unit for transferring thermal energy from engine waste heat to a heat exchange medium. The heat exchange unit has a waste heat side and a heat exchange medium side. The heat exchange unit waste heat side includes a waste heat input that receives waste heat from the engine and inputs the received waste heat into the heat exchange unit. The heat exchange unit heat exchange medium side includes a heat exchange medium inlet for receiving heat exchange medium. A waste heat outlet is connected to the waste heat side of the heat exchange unit, and a heat exchange medium outlet is connected to the heat exchange medium side of the heat exchange unit. The system also includes an air compressor device having a heat exchange medium inlet in communication with the heat exchange medium outlet of the heat exchange unit, a heat exchange medium outlet operatively connected in a loop fashion to the heat exchange medium inlet of the heat exchange unit, an ambient air intake for drawing in ambient air into the air compressor device, and a compressed air outlet connected to an air intake of the compression cylinder of the split-cycle engine for delivering compressed air to the engine. Energy extracted from the heat exchange medium drives the air compressor device to draw in ambient air through the ambient air intake and to output compressed air to the engine.

A method of recovering waste heat from a split-cycle engine having a compression cylinder and a power cylinder includes the steps of: providing an air compression system including an air compressor device; delivering waste heat from the engine to the air compression system; utilizing energy from the waste heat to power the air compressor device to produce compressed air; and delivering waste-heat generated compressed air from the air compressor device to the compression cylinder of the split-cycle engine.

In a specific embodiment of the method, a heat exchange unit may be provided to utilize the waste heat to change a heat exchange medium from a liquid phase to a gas phase. The step of delivering waste heat from the engine to the air compression system may include circulating engine coolant through the engine and the heat exchange unit. Also, the step of delivering waste heat from the engine to the air compression system may include passing engine exhaust gases from the engine through the heat exchange unit. After the exhaust gases are passed through the heat exchange unit, the exhaust gases may be vented to the atmosphere through an engine exhaust system.

The method may further include the step of circulating the heat exchange medium through the heat exchange unit and the air compressor device. The step of circulating the heat exchange medium may include pumping the heat exchange medium. A condenser may be provided downstream of the air compressor device to change the heat exchange medium from the gas phase to the liquid phase. Excess heat from the condenser may be vented to the atmosphere. The air compressor device may draw in ambient air through an ambient air intake. Waste-heat generated compressed air may be delivered to the engine through a compressed air outlet operatively connected to an engine air intake. The waste-heat generated compressed air also may be stored in an air storage tank of the split-cycle engine. Further, an air storage tank of the split-cycle engine may be charged with waste-heat generated compressed air from the compression cylinder while the power cylinder is simultaneously driven with waste-heat generated compressed air from the air storage tank.

These and other features and advantages of the invention will be more fully understood from the following detailed description of the invention taken together with the accompanying drawings.

DETAILED DESCRIPTION OF THE INVENTION

Figure 3:
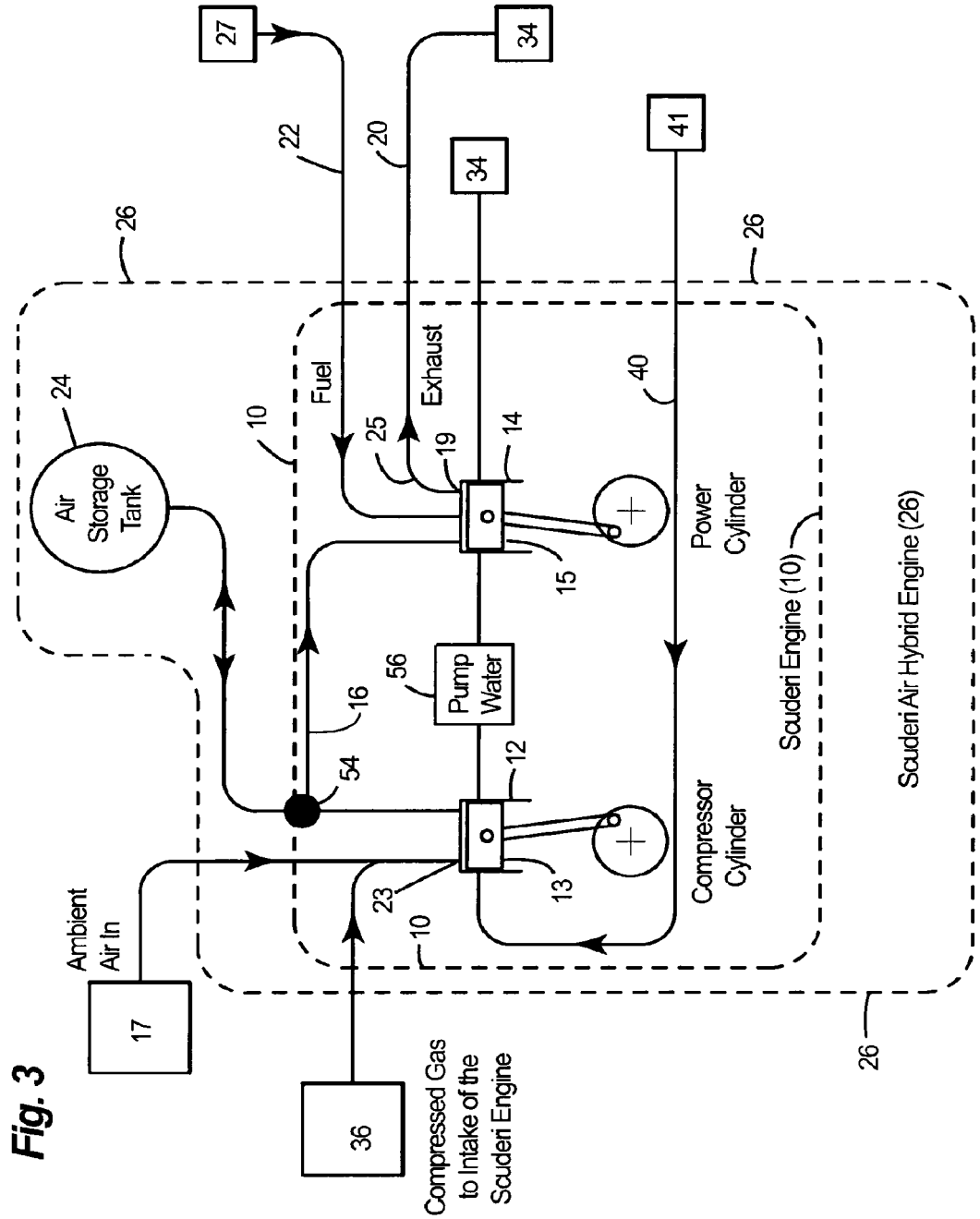
FIG. 3 is a schematic view of a split-cycle engine utilizing the waste heat recovery system.

Referring now to the drawings in detail, numeral 10 generally indicates a split-cycle engine, such as a Scuderi split-cycle engine. As shown in FIG. 3, the split-cycle engine 10 includes an engine block having at least one compression cylinder 12 and a paired adjacent power cylinder 14. The engine 10 may have any number of pairs of compression cylinders and power cylinders. A gas passage 16 (also referred to as a cross-over passage) interconnects the compression cylinder 12 and power cylinder 14 of each pair. The gas passage includes an inlet and an outlet defining a pressure chamber therebetween. The gas passage inlet is connected to the compression cylinder 12 and the gas passage outlet is connected the power cylinder 14.

A compression piston 13 is received in the compression cylinder 12. Likewise, a power piston 15 is received in the power cylinder 14. A crankshaft rotatable about a crankshaft axis is operatively connected the compression piston 13 and power piston 15. The compression piston 13 reciprocates through an intake stroke and a compression stroke during a single rotation of the crankshaft, and the power piston 15 reciprocates through a power (or expansion) stroke and an exhaust stroke during a single rotation of the crankshaft.

The compression cylinder 12 includes an air intake 17 for communicating intake gas such as ambient air from an intake passage 23 into the compression cylinder 12. The power cylinder 14 includes an exhaust port 19 for releasing exhaust gases 20 from the power cylinder 14 into an exhaust passage 25.

An internal combustion engine (ICE) mode of operation is generally the normal operating mode of the split-cycle engine 10. The intake, compression, power and exhaust strokes of a conventional piston engine cycle are split between the compression 12 and power cylinders 14 of the split-cycle engine 10. In the ICE mode, the compression piston 13 draws in and compresses ambient inlet air from intake passage 23 for use in the power cylinder 14. Compressed air and fuel communicated via fuel line 22 from fuel reservoir 27 is admitted to the power cylinder 14 through the gas passage 16 shortly after the power piston 15 reaches its top dead center (TDC) position at the beginning of an expansion stroke. Alternatively, the fuel may be directly injected into power cylinder 14 via fuel line 22. The fuel/air mixture is then ignited, burned and expanded on the same expansion stroke of the power piston 15, transmitting power to the crankshaft. The combustion products are discharged on the exhaust stroke through exhaust passage 25.

Optionally, the engine 10 may include an air storage tank 24 and generally may be referred to as an air hybrid split-cycle engine 26. The air hybrid split-cycle engine 26 includes all of the components of the split-cycle engine 10. As an air hybrid, the split-cycle engine 26 may store compressed air in the air storage tank 24 for later use. The compressed air stored in the air storage tank 24 may be used as an intake air charge to be mixed with fuel for combustion within the power cylinder 12.

Alternatively, compressed air from the air storage tank 24 may be delivered to the power cylinder 14 without being mixed with fuel such that no combustion takes place in the power cylinder. In this mode of operation, the compressed air stored in the air storage tank 24 may be used to drive the power piston 15 in the power cylinder 14. This mode of operation generally may be referred to as an air motoring mode.

Figure 1:
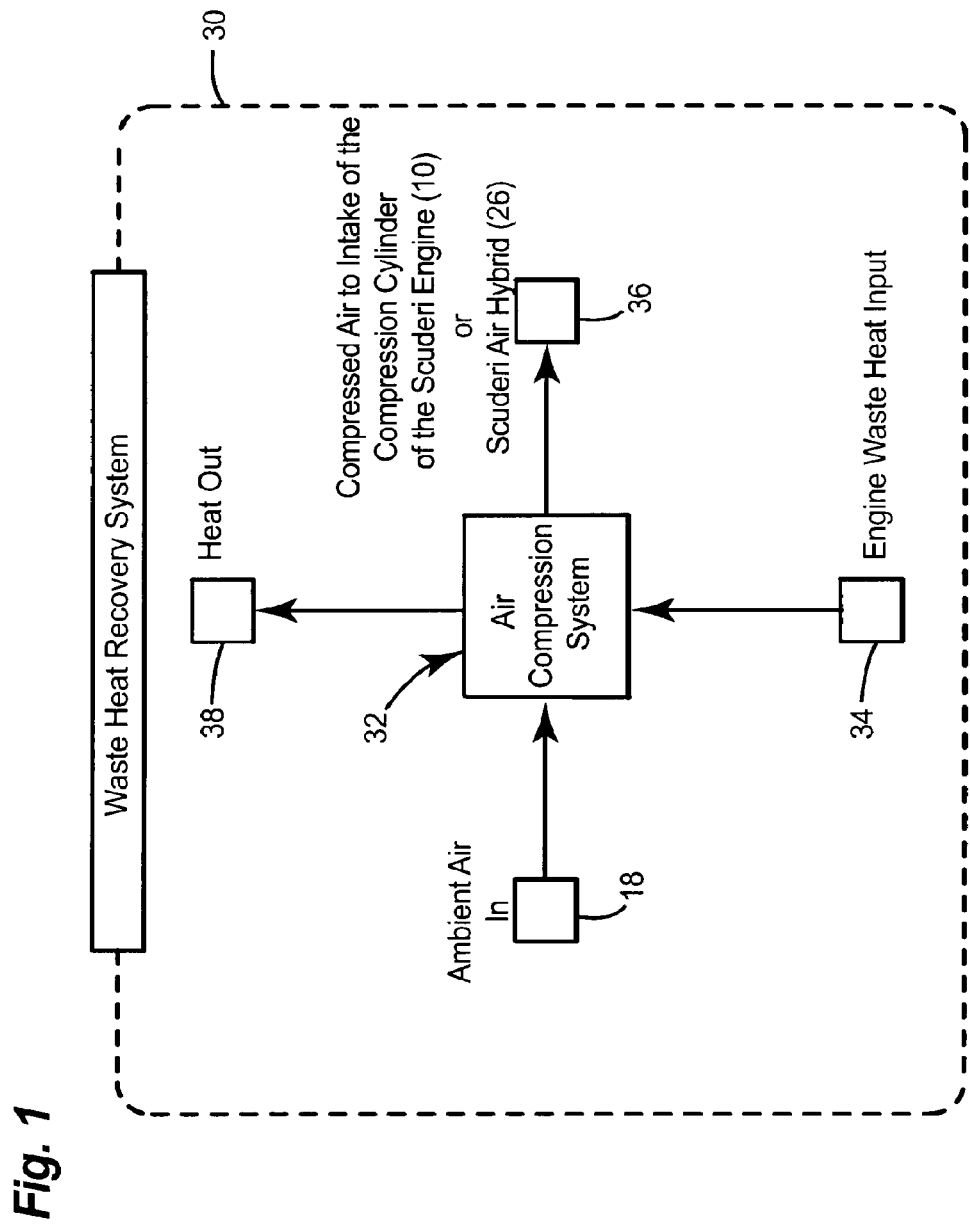
FIG. 1 is a schematic view generally illustrating a waste heat recovery system for a split-cycle engine.

The present invention provides a waste heat recovery system 30 for the split-cycle engine 10. The waste heat recovery system 30 as seen in FIG. 1 utilizes waste heat generated by the split-cycle engine 10 and collected by one or more waste heat inputs 34 in fluid communication with a heat exchange unit 46. The waste heat input 34 typically receives engine waste heat from a fluid such as exhaust gas or engine coolant. The energy converted from the waste heat is used to power an air compression system 32. The air compression system 32 includes an air compressor device 48, such as a pump, turbine, or other compressor device, to compress ambient air, which is drawn in through an ambient air intake 18. Compressed air is communicated through a compressed air outlet 36 on the air compressor device 48 to the compression cylinder(s) 12 of the split-cycle engine 10. The compressed air may be further compressed in compression cylinder 12 for immediate use in powering the split-cycle engine 10 when the engine is operating in its ICE mode. Alternatively, the compressed air may be stored in the air storage tank 24 for later use in the combustion process which powers engine 10. The stored compressed air may also be used to power the engine 10 without the need for combustion in the power cylinder 14 (e.g., in the air motoring mode). The present waste heat recovery system 30 thereby utilizes engine heat that otherwise would be wasted and improves the fuel efficiency of the engine 10 by reducing fuel consumption.

Figure 2:
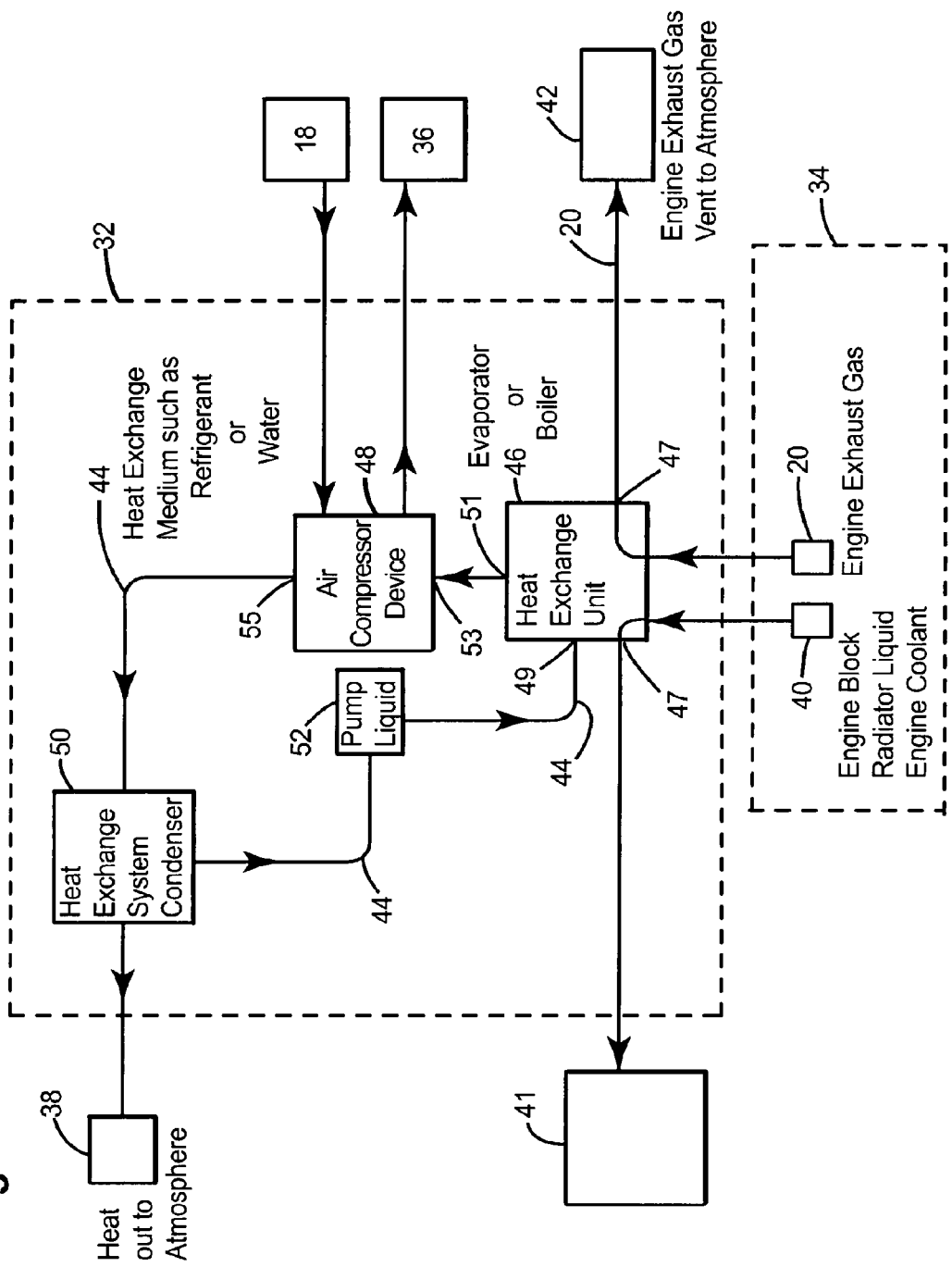
FIG. 2 is a schematic view of the waste heat recovery system of FIG. 1 illustrating an air compression subsystem and engine waste heat subsystem in detail.

Referring to FIGS. 1 through 3, the waste heat recovery system 30 generally includes an air compression system 32. Engine waste heat received from one or more waste heat inputs 34 in communication with a heat exchange unit 46, such as a heat exchanger, receives engine waste heat from a fluid, typically engine coolant, exhaust gas, or the like, and uses the energy of the waste heat to power the air compression system 32, which compresses ambient air. Compressed air and heat are outputs from the air compression system 32. The compressed air may be inputted to the compression cylinder 12 of the split-cycle engine 10 to be used by the engine or stored in the storage tank 24 for later use, as described in more detail below.

The engine waste heat generated by the engine 10 includes both heat in the engine coolant and heat in the engine exhaust gases. In an engine coolant subsystem 40, the engine coolant draws heat from the engine block in order to cool the engine block as known in the art. Engine coolant in the engine coolant subsystem 40 is communicated to the air compression system 32 and returned to the engine 10 via engine coolant subsystem return 41. Specifically, hot engine coolant is cycled through the air compression system 32 to transfer heat energy from the hot engine coolant to a heat exchange medium, which in turn flows in a cyclic loop via circulation line 44 within the air compression system 32 and cools the engine coolant. Similarly, an exhaust gas subsystem 20 receives exhaust gases generated by the combustion process in the engine 10. The exhaust gas subsystem 20 communicates exhaust gases to the air compression system 32. More specifically, the hot exhaust gases in the exhaust gas subsystem 20 are passed through the air compression system 32 to transfer heat energy to the heat exchange medium, and to recover heat energy in the exhaust gases prior to venting the exhaust gas to atmosphere via an exhaust outlet 42.

The engine coolant subsystem 40 and exhaust gas subsystem 20 are in fluid communication with the waste heat input 34 of the heat exchange unit 46. Heat from the engine coolant and the engine exhaust gases is transferred to the heat exchange medium via heat exchange unit 46. The heat exchange unit 46 is included in the air compression system 32. The heat exchange unit 46 has a waste heat side and a heat exchange medium side. The waste heat input 34 receives fluids (e.g., coolant, exhaust gases) from the engine into the waste heat side of the heat exchange unit 46. Waste heat outlets 47 are connected to the waste heat side of the heat exchange unit 46 for communicating fluids out of the waste heat side of the heat exchange unit. The heat exchange medium side of the heat exchange unit 46 includes a heat exchange medium inlet 49 for receiving heat exchange medium into the heat exchange unit. A heat exchange medium outlet 51 is connected to the heat exchange medium side for communicating heat exchange medium out of the heat exchange unit 46.

The heat exchange unit 46 may be an evaporator, boiler, or other suitable heat exchange apparatus. The heat exchange medium may be a refrigerant, water, or other similar heat exchange medium suitable for the present air compression system 32. In the heat exchange unit 46, the heat exchange medium is heated and changes from the liquid phase to the gas phase.

While passing through the heat exchange unit 46, the heat exchange medium absorbs the engine waste heat and is evaporated and converted to the gas phase. The expanding, gaseous heat exchange medium is then communicated from the heat exchange unit 46 via outlet 51 to a heat exchange medium inlet 53 of the air compressor device 48. The gaseous heat exchange medium is utilized to power the air compressor device 48, which draws in ambient air through intake 18 and outputs compressed air through outlet 36.

The heat exchange medium exits the air compressor device 48 through heat exchange medium outlet 55 and passes to a condenser 50 where it is condensed back to a liquid phase. In the condenser 50, any excess heat retained by the heat exchange medium 44 is captured and released to the atmosphere via a heat outlet 38 such as a vent or similar. The heat exchange medium is then pumped back to the heat exchange unit 46 by a pump 52 completing the fluid's flow loop to begin its cycle over again.

The air compression system 32 is coupled to a dedicated compression cylinder(s) 12 of the split-cycle engine 10. The compressed air from the air compression system 32 is fed to the compression cylinder 12 through the intake passage 23 of the compression cylinder. Ambient air may also be drawn into the compression cylinder 12 through the air intake 17 for compression in the compression cylinder. The compressed air may then travel to the power cylinder 14 through the gas passage 16. Alternatively, the compressed air may be stored in the air storage tank 24 for later use by the engine 10. The compressed air may enter the air storage tank 24 through a port 54 that branches off the gas passage 16.

Fuel may be directly injected into the power cylinder 14 for mixing with the compressed air 36 to form a combustible mixture that is ignited in the power cylinder to create power. Alternatively, the fuel may be port fuel injected into the gas passage 16 downstream of the branch port 54 to mix with the compressed air prior to entering the power cylinder 14.

Combustion in the power cylinder 14 generates hot exhaust gases that are fed to the air compression system 32 via the exhaust gas subsystem 20 as described above. Further, combustion in the engine 10 heats the engine block. Engine coolant in the engine coolant subsystem 40 is cycled through the engine block to and from the air compression system 32 by a pump 56 to cool the engine block as described above.

In the air motoring mode of operation, the split-cycle engine 10 may use the compressed air generated by the air compression system 32 and stored in the air storage tank 24 to drive the power piston 15 in the power cylinder 14. After the compressed air has expanded in the power cylinder 14, the air may be exhausted through the exhaust passage 25. In this mode, the compression cylinder 12 is idled and no combustion takes place in the power cylinder 14.

Figure 4:
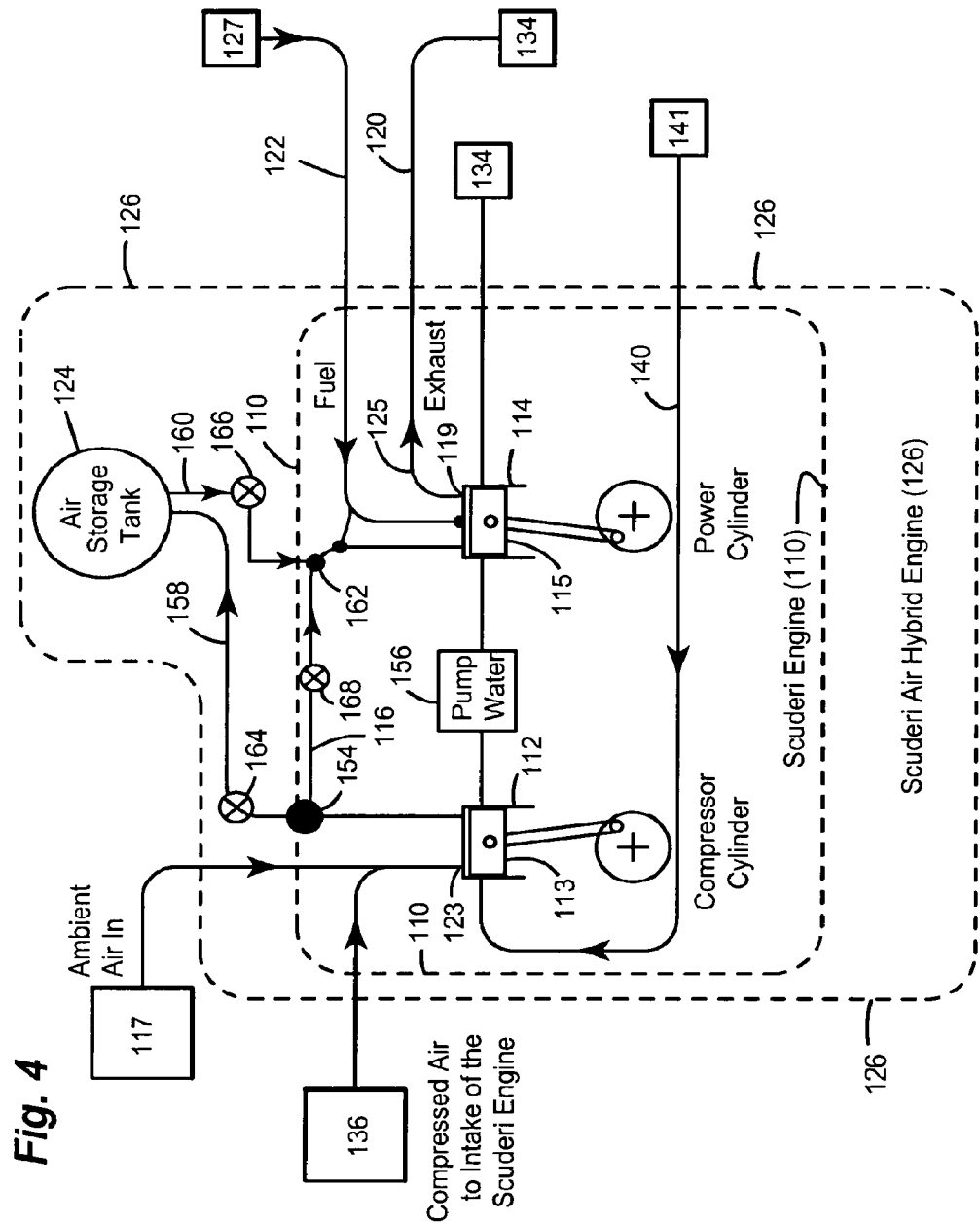
FIG. 4 is an alternative schematic view of a split-cycle engine utilizing the waste heat recovery system.

Referring now to FIG. 4, in an alternative embodiment of the air hybrid split-cycle engine 126, compressed ambient air from the compression cylinder 112 enters the storage tank 124 through input passage 158, which is connected to port 154. The stored air exits the air storage tank 124 through outlet passage 160, which is connected to port 162. Valves 164 and 166 control flow into and out of the tank 124, while valve 168 controls flow across the gas passage 116. With control valves 164 and 166 open and valve 168 closed, waste-heat generated compressed air may simultaneously charge the tank 124 through input passage 158 while driving the power cylinder 114 via output passage 160. Moreover, in this configuration, valves 164, 166, and 168 may be utilized to provide additional flow control between the air tank 124 and either compression cylinder 112 or power cylinder 114. In other remaining aspects, the split-cycle air hybrid engine 126 has the same features as the split-cycle air hybrid 26, and similar reference numerals indicate similar features.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A waste heat recovery system for a split-cycle engine including a compression cylinder, a power cylinder, and a gas passage interconnecting the compression cylinder and the power cylinder, and an air storage tank connected to the gas passage by a branch port, the waste heat recovery system comprising: a heat exchange unit; an air compressor device in fluid communication with the heat exchange unit; a waste heat input for receiving waste heat from the engine in fluid communication with the heat exchange unit; an ambient air intake connected to the air compressor device for drawing air into the air compressor device; and a compressed air outlet member on the air compressor device for delivering compressed air from the air compressor device to the air storage tank for later use in a combustion process in the power cylinder of the engine; means for driving the air compressor via engine waste heat.

2. The waste heat recovery system of claim 1, wherein an engine coolant subsystem is in communication with the heat exchange unit, and engine coolant is circulated from the engine through the heat exchange unit.

3. The waste heat recovery system of claim 1, wherein an engine exhaust subsystem is in communication with the heat exchange unit to pass engine exhaust gas through the heat exchange unit.

4. The waste heat recovery system of claim 1, including a circulation line for circulating heat exchange medium between the heat exchange unit and the air compressor device.

5. The waste heat recovery system of claim 4, wherein the heat exchange medium is one of a refrigerant and water.

6. The waste heat recovery system of claim 4, including a condenser operatively connected to the circulation line.

7. The waste heat recovery system of claim 4, including a pump operatively connected to the circulation line for pumping the heat exchange medium through the circulation line.

8. The waste heat recovery system of claim 1, wherein the compressed air is stored in the air storage tank.

9. The waste heat recovery system of claim 1, including a first valve for controlling flow into the storage tank, a second valve for controlling flow out of the storage tank, and a third valve for controlling flow across the gas passage, wherein the compressed air simultaneously charges the storage tank and drives the power cylinder when the first and second valves controlling flow into and out of the storage tank are open and the third valve controlling flow across the gas passage is closed.

10. The waste heat recovery system of claim 1, wherein the engine is operable to initiate said combustion process in the power cylinder shortly after the power piston reaches its top dead center (TDC) position.

11. The waste heat recovery system of claim 1, operable to inject fuel into the gas passage downstream of the branch port to mix with compressed air prior to entering the power cylinder.

12. The waste heat recovery system of claim 11, wherein the engine is operable to initiate said combustion process in the power cylinder shortly after the power piston reaches its top dead center (TDC) position.

13. A method of recovering waste heat from a split-cycle engine including a compression cylinder, a power cylinder, a gas passage interconnecting the compression cylinder and the power cylinder, and an air storage tank connected to the gas passage by a branch port, the method comprising:

providing an air compression system including an air compressor device;

delivering waste heat from the engine to the air compression system;

utilizing energy from the waste heat to power the air compressor device; and delivering waste-heat generated compressed air from the air compressor device to the air storage tank for use in a combustion process in the power cylinder of the split-cycle engine.

14. The method of claim 13, including the step of:

providing a heat exchange unit to utilize the waste heat to change a heat exchange medium from a liquid phase to a gas phase.

15. The method of claim 14, wherein the step of delivering waste heat from the engine to the air compression system includes:

circulating engine coolant through the engine and the heat exchange unit.

16. The method of claim 14, wherein the step of delivering waste heat from the engine to the air compression system includes:

passing engine exhaust gases from the engine through the heat exchange unit.

17. The method of claim 16, including the step of:

venting the exhaust gases to the atmosphere through an engine exhaust system after the exhaust gases are passed through the heat exchange unit.

18. The method of claim 14, including the step of:

circulating the heat exchange medium through the heat exchange unit and the air compressor device.

19. The method of claim 18, wherein the step of circulating the heat exchange medium includes:

pumping the heat exchange medium.

20. The method of claim 18, including the step of:

providing a condenser downstream of the air compressor device to change the heat exchange medium from the gas phase to the liquid phase.

21. The method of claim 20, including the step of:

venting excess heat from the condenser is to the atmosphere.

22. The method of claim 13, including the step of:

drawing ambient air into the air compressor device through an ambient air intake.

23. The method of claim 13, including the step of:

delivering waste-heat generated compressed air to the engine through a compressed air outlet operatively connected to an engine air intake.

24. The method of claim 13, including the step of:

storing waste-heat generated compressed air from the compression cylinder in the air storage tank of the split-cycle engine.

25. The method of claim 13, including the steps of:

charging the air storage tank of the split-cycle engine with waste-heat generated compressed air from the compression cylinder; and simultaneously driving the power cylinder with waste-heat generated compressed air from the air storage tank.

26. The method of claim 13, further comprising:

initiating said combustion process in the power cylinder shortly after the power piston reaches its top dead center (TDC) position.

27. The method of claim 13, further comprising:

injecting fuel into the gas passage downstream of the branch port to mix with compressed air prior to entering the power cylinder.

28. The method of claim 27, further comprising:

initiating said combustion process in the power cylinder shortly after the power piston reaches its top dead center (TDC) position.

* * * * *